United States Patent [19]

Mronga et al.

[11] Patent Number: 5,026,429

[45] Date of Patent: Jun. 25, 1991

[54] METAL OXIDE COATED PLATELET-LIKE ORGANIC PIGMENTS

[75] Inventors: Norbert Mronga, Dossenheim; Werner Ostertag, Gruenstadt; Gustav Bock, Neustadt, all of Fed. Rep. of Germany

[73] Assignee: BASF Aktiengesellschaft, Ludwigshafen, Fed. Rep. of Germany

[21] Appl. No.: 470,360

[22] Filed: Jan. 25, 1990

[30] Foreign Application Priority Data

Feb. 2, 1989 [DE] Fed. Rep. of Germany ....... 3903023

[51] Int. Cl.$^5$ .................... C09B 47/00; C09B 67/00; C09B 69/00
[52] U.S. Cl. .................... 106/400; 106/401; 106/410; 106/437; 106/459; 106/493; 106/498; 106/904; 428/402; 428/403; 428/938; 523/135; 523/171; 260/998.17; 427/213
[58] Field of Search ............... 106/410, 437, 459, 493, 106/498, 904; 428/402, 403, 938; 523/135, 171; 260/998.17; 427/213

[56] References Cited

U.S. PATENT DOCUMENTS

| | | | |
|---|---|---|---|
| 3,087,828 | 4/1983 | Linton | 106/417 |
| 3,087,829 | 4/1963 | Linton | 106/417 |
| 4,264,648 | 4/1981 | Ziolo et al. | 427/128 |
| 4,268,541 | 5/1981 | Ikeda et al. | 427/177 |
| 4,344,987 | 8/1982 | Ostertag et al. | 427/213 |
| 4,370,270 | 1/1983 | Bock et al. | 540/141 |
| 4,373,963 | 2/1983 | Uenishi et al. | 106/415 |
| 4,415,650 | 11/1983 | Kido et al. | 430/273 |
| 4,705,739 | 11/1987 | Fisch | 430/276 |
| 4,880,472 | 11/1989 | Bugnon et al. | 106/493 |

FOREIGN PATENT DOCUMENTS

| | | |
|---|---|---|
| 0296111 | 12/1988 | European Pat. Off. |
| 1467468 | 12/1968 | Fed. Rep. of Germany |
| 2009566 | 11/1971 | Fed. Rep. of Germany |
| 0042507 | 12/1981 | Fed. Rep. of Germany |
| 3709217 | 9/1988 | Fed. Rep. of Germany |
| 62100766 | 5/1987 | Japan |
| 01257860 | 10/1989 | Japan |

Primary Examiner—William R. Dixon, Jr.
Assistant Examiner—Scott L. Hertzog
Attorney, Agent, or Firm—Keil & Weinkauf

[57] ABSTRACT

A luster pigment is described which is made up of a metal oxide film on a colored platelet-like support. The support is a pigment having a length of 3-150 μm, a width of 3-150 μm, and a thickness of 0.1-2 μm. A process is described for the preparation of the pigment in which an organic platelet-like pigment is coated with a metal-oxide film by chemical vapor deposition. The preferred platelet-like organic pigment is β-copper phthalocyanine.

7 Claims, No Drawings

METAL OXIDE COATED PLATELET-LIKE ORGANIC PIGMENTS

The present invention relates to novel luster pigments and to a process for preparing same.

Luster or effect pigments have become more and more popular in recent years in many industries as well as decorative cosmetics. Their distinguishing feature is directional reflection at two-dimensionally aligned, oriented pigment particles (German Standard Specification DIN 55944 - 1.1.2.4.) having a plateletlike habit and a large particle diameter. Depending on whether the reflection takes place at a metallic or a highly refractive transparent phase, luster pigments are subdivided into metallic effect pigments and pearl luster pigments. If a further distinction is made between single- and multi-phase pigments, then most of the luster pigments used can be fitted into the systematic classification depicted in Table 1.

TABLE 1

| | Structure of luster pigments | |
|---|---|---|
| | Single-phase | Multiphase |
| transparent or semi-transparent (pearl luster pigments) | natural pearl essence, BiOCl, $\alpha$-Fe$_2$O$_3$ PbCO$_3$·Pb(OH)$_2$, special $\beta$-copper-phthalocyanine | substrates: mica, $\alpha$-Fe$_2$O$_3$ coatings: Fe$_2$O$_3$, TiO$_2$, Cr$_2$O$_3$, oxidic mixed phases, Prussian blue |
| hiding (metallic effect pigments) | aluminum, brass and copper bronzes | substrates: aluminum, brass and copper coatings: Fe$_2$O$_3$, TiO$_2$, copper oxides |

Luster pigments can exist in colored or colorless forms. The color of colored luster pigments is predominantly due to absorption. Multiphase pigments can form a color which is different from the absorption colors because of interference phenomena at the coating on platelets. A well known example thereof are the TiO$_2$-coated mica pigments which are commercially available in various shades.

The color impression due to interference colors created at filmlike coatings varies greatly with the color of the background underneath. Above a white background they appear indistinct and very weak in color, whereas for example above a black background they appear more distinct and significantly more intensive. This is because a black background absorbs all of the transmitted light which contains the complementary color to the reflected light, so that it can no longer be reflected by the background and hence no longer impair the reflected interference color. Above a colored background only part of the transmitted light is absorbed. The light reflected by the background can then interact with the reflected interference light to form new original color impressions.

This well known cosmetic effect, that pearl luster pigments which give interference color effects, e.g. TiO$_2$-coated mica platelets, look different depending on the skin color background, has been sought to be copied by mixing in black or color pigments. However, the simultaneous processing of different pigments is difficult, so that such mixtures have not become established in practice.

Pearl luster pigments which give interference color effects customarily consist of (colorless) mica flakes as substrate and, applied thereto, transparent oxide layers, in particular titanium dioxide, iron(III) oxide and iron-(II,III) oxide but also zirconium dioxide, chromium(III) oxide, vanadium(V) oxide or hydrates thereof (cf. DE-C-1,467,468). If colored substrates are used, special effects can be obtained due to the combination of interference and absorption colors. However, the choice of colored inorganic plateletlike substrates is restricted to a few substances. DE-C-2,009,566 mentions for example graphite. US-A-4,373,963 describes plateletlike, red pigments of iron oxide which contain aluminum oxide in solid solution and which may bear a titanium dioxide coating. DE-A-3,709,217 describes plateletlike pigments which besides aluminum oxide and iron oxide additionally contain manganese oxide, which have a reddish yellow to black color, depending on the particle size, and which can be coated with highly refractive oxide films such as TiO$_2$ and Fe$_2$O$_3$ to produce luster pigments. In the last case mentioned, the coating is a colored coating which, owing to the self-color of the iron oxide, gives brilliant shades only in the yellow/red region. Blackish yellow, blackish red and pure black plateletlike pigments based on aluminum oxide and iron oxide are described in DE-A-3,636,076. These pigments may likewise be used as substrates for pearl luster pigments, to which end they may be coated with colorless or colored oxides.

In summary it can be stated that the substrate which comes into consideration for preparing pearl luster pigments is essentially plateletlike colorless mica, but that it is also possible to use colored or black substrates, in which case, however, the choice is restricted to very few compounds and a narrow selection of shades.

It is an object of the present invention to provide a luster pigment composed of a metal oxide film on a colored support where there is a wide choice of color for the colored support. It is a further object of the present invention to indicate how such a pigment might be prepared.

We have found that these objects are achieved when the support is a plateletlike organic color pigment.

Previously there have been n luster pigments composed of a TiO$_2$, Fe$_2$O$_3$ or other highly refractive metal oxide coating on a plateletlike organic color pigment, probably not least because it is preparatively difficult to provide a hydrophobic organic pigment with a firmly adherent hydrophilic inorganic coating.

Suitable supports for the purposes of the present invention are organic color pigments which are plateletlike, i.e. from 3 to 150 $\mu$m, preferably from 5 to 70 $\mu$m, in length, from 3 to 150 $\mu$m, preferably from 5 to 50 $\mu$m, in width and from 0.1 to 2 $\mu$m in thickness. They should be inherently stable; that is, they should not fragment under the conditions under which the filmlike coatings of inorganic oxides are applied. The color of the pigment according to the present invention is determined by the absorption color of the organic pigment support and by the interference color of the applied coating of inorganic oxide, which in turn can be varied via the thickness of the oxide layer.

Particularly suitable organic color pigments are for example $\beta$-copper phthalocyanine pigments as described in EP-A-0,042,507. These pigments are particularly preferred since particularly attractive interference colors can be perceived above their reddish blue self color. It is also possible to use perylene pigments, i.e. diimides of 3,4,9,10-perylenetetracarboxylic acid, fluororubine pigments. Pulverulent pigments can be converted into plateletlike pigments by the known methods of recrystallization. Variation of the thickness of the inorganic oxide layer and the attendant variation of interference color makes it possible to produce from a given support material of inorganic color pigment a large number of luster pigments having different shades. The inorganic layer has a high refractive index of $n>2$, while the organic color pigment support has a lower refractive index, i.e. a refractive index distinctly below 2 ($n<2$). Consequently, the refractive index of this pigment differs only little from the refractive index of the lacquer medium surrounding it. Application of the highly refractive oxide coating raises the proportion of light reflected at the pigment surface and hence, according to the laws of optics (Fresnel equation), makes an organic pigment support clearly visible. The inorganic layer has for example the following refractive indices: anatase $n=2.4$; rutile $n=2.7$; $Fe_2O_3$ $n=2.8$; $ZrO_2$ $n=2.4$; and magnetite $n=2.4$. To increase the reflectivity of the pigment according to the present invention, only a relatively thin coating of up to about 35 nm is required. If the coating is made any thicker, interference phenomena occur, leading to the above-described color play.

The present invention also provides a convenient process for preparing the pigment according to the present invention, viz. a chemical vapor deposition (CVD) process. In this process, the organic color pigment is kept in a fluidized state while a gaseous compound of the metal whose oxide is to form the desired coating is made to react with a similarly gaseous compound to form the desired oxide. Suitable gaseous metal compounds are for example the carbonyls and chlorides of Ti, V and Zr, the starting materials are for example $TiCl_4$, $VCl_4$ and $ZrCl_4$, which are reacted in the gas phase with water vapor in the fluidized bed of organic color pigment support to obtain the corresponding oxides. In the case of coatings of iron and chromium, it is advantageous to start from the corresponding carbonyl compounds $Fe(CO)_5$ and $Cr(CO)_6$, which are converted with oxygen into the corresponding oxides. The much simplified mass balance equations read as follows:

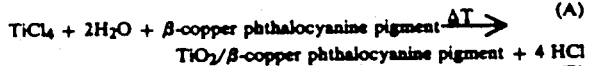
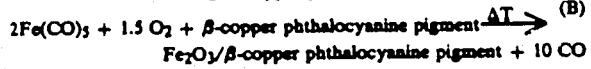

In this way it is possible to produce highly lustrous interference pigments of high color intensity.

The substrates used are for example the abovedescribed plateletlike organic color pigments. The desired particle size of the pigments is as stated above. The specific free surface area (BET, $N_2$ adsorption) of the color pigment is within the range from 0.5 to 5 $m^2/g$. The surface area of the platelets should be substantially free of greases or other coating matter.

In detail, a plateletlike organic color pigment is coated for example with $TiO_2$ or $Fe_2O_3$ by introducing the dry pigment into a heatable fluidized bed reactor made of glass or metal and fluidizing it therein with fluidizing air. To prevent the escape of fine particles, the fluidizing reactor is advantageously provided at the top end with a cleanable filter.

The fluidized matter is heated by wall heating or IR radiation to 100–280° C. A particularly advantageous reaction temperature range has been found to be 180–240° C. To prevent any electrostatic charge buildup because of its adverse effect on the fluidizing characteristics of the pigment, water vapor is passed into the fluidized bed during the heating-up phase. The water vapor is advantageously introduced by passing some or all of the fluidizing gas through hot water, thereby saturating the gas with water vapor. Water vapor can also be introduced separately into the fluidized bed via a nozzle on the side. Once the fluidized bed has come to the desired final temperature, $TiCl_4$ or $Fe(CO)_5$ vapor is passed into the fluidized bed via a further nozzle attached on the side of the fluidized bed. This is advantageously done by introducing an inert carrier gas, for example nitrogen, laden with the desired amount of $TiCl_4$ or $Fe(CO)_5$.

To ensure a high quality, i.e. uniform, filmlike metal oxide coating on the surface of the plateletlike organic pigment particles, it is important that the $TiCl_4$ or $Fe(CO)_5$ is introduced into the fluidized bed only in low concentration. In the bed, these substances can then react with the excess of reactant (water vapor or oxygen).

Experiments have shown that, based on the total amount of other gases or vapors introduced into the fluidized bed, the amount of $TiCl_4$ or $Fe(CO)_5$ vapor should not exceed 5% by volume. In calculating this amount it must be borne in mind that water vapor is always present in an amount of more than 2 moles per mole of $TiCl_4$ and contributes to the total amount of the other gases.

As the reaction progresses, the organic color pigment platelets become covered with a coating of $TiO_2$ or $Fe_2O_3$ which grows in thickness, producing a continual change in the color of the pigment. For instance, $TiO_2$-coated $\beta$-copper phthalocyanine pigments initially have a bluish violet color, which changes to blue, green, golden and then back to violet. A similar sequence of colors is observed for $Fe_2O_3$-coated $\beta$-copper phthalocyanine pigments.

It is also possible to use the process according to the present invention to combine $TiO_2$ and $Fe_2O_3$ layers. For instance, a $TiO_2$-coated $\beta$-copper phthalocyanine pigment which is violet in color may be converted by further coating with $Fe_2O_3$ into a bluish gray pigment. Equally, the opposite sequence (first iron oxide and then titanium oxide) and application of multiple double layers presents no problems. For reasons of weathering fastness, however, destined for outdoor use preferably have an outer oxide film of $Fe_2O_3$. An additional surface treatment with known inorganic and organic coating agents, for example $SiO_2$ or fatty acids, to improve the dispersing properties, the orientability, the luster and the weathering fastness of the pigment is possible.

Characterization of the interference/absorption pigment produced by the above process reveals a homogeneous and uniform oxide layer on the organic color pigment support. The surface of the coating is smooth. The coating itself consists of dense, polycrystalline oxides, for example $TiO_2$ and $Fe_2O_3$. No crystallographic direction of preference is discernible. The color of the pigment is dependent on the layer thickness. It also changes as with all interference pigments with the angle of observation (flop).

By X-ray analysis it is possible to identify the individual oxides in alternately coated organic color pigments as separate phases. Weathering tests have shown that pigments which contain an $Fe_2O_3$ phase as the outermost layer have excellent weathering properties, so that they can be used for exterior applications, for example for making automotive coatings. This use is also favored by the high hiding power of the pigment. The luster pigment according to the present invention, however, can also be used for coloring plastics, printing inks and cosmetic products as well as for pigmenting coating compositions.

The experiments which follow illustrate the invention by way of example.

In the Examples described hereinafter, the following apparatus was used:

infrared-heatable fluidizing reactor (diameter 6 cm, length 120 cm) made of glass and having a conical gas inlet on the underside, nitrogen-cleanable filter socks of polytetrafluoroethylene needle felt on the upper side, and two-material nozzles attached on the side a third of the way up.

EXAMPLE 1

The fluidized bed reactor is charged with 250 9 of plateletlike β-copper phthalocyanine (BET surface area 3 $m^2/g$) having the average dimensions (width, length, thickness) of 10, 50 and 0.5 μm respectively. The product is fluidized by air which is passed through hot water at 50° C. being introduced in a conical fluidizing reactor inlet at 600 l/h, and is heated by the IR radiators to 195–225° C. Once this temperature range has been reached, nitrogen which has been laden with $TiCl_4$ by passing through a $TiCl_4$-containing hot saturator flask at 65° C. is introduced into the oven through a nozzle at 300 l/h. The $TiCl_4$ reacts with the water vapor carried in with the air stream to give $TiO_2$ and HCl. Under the chosen reaction conditions, the $TiO_2$ formed deposits spontaneously as a film on the μ-copper phthalocyanine platelets. In total, the amount of $TiCl_4$ introduced into the fluidized bed over a period of 6 hours is 160 ml. After every 10 ml, a pigment sample is taken. In the course of the coating, there is a strong change in color from violet over blue, green and gold back to violet. Nitrogen which has been laden with $Fe(CO)_5$ by passing through an $Fe(CO)_5$-containing hot saturator flask at 65° C. is introduced through a nozzle into the reactor at 300 l/h. The $Fe(CO)_5$ reacts with the oxygen of the air stream to form $Fe_2O_3$ and CO. Under the reaction conditions chosen, the $Fe_2O_3$ formed deposits spontaneously as a film on the $TiO_2$-coated β-copper phthalocyanine platelets. In total, 50 ml of $Fe(CO)_5$ are introduced into the fluidized bed over a period of 3 hours. In the course of this second coating, the color changes from violet to grayish blue.

The result obtained is a pigment containing 18.3% by weight of Ti and 5.3% by weight of Fe.

Under the microscope it can be seen that the β-copper phthalocyanine substrate has been coated with metal oxides in the form of a smooth film which covers the substrate uniformly all over. No non-film deposits of $TiO_2$ or $Fe_2O_3$ particles or insular outgrowths can be seen. The pigment has a strong grayish blue self-color combined with a high luster. The particle size has not been changed by the CVD process.

X-ray analysis indicates β-copper phthalocyanine, anatase and hematite.

EXAMPLE 2

The fluidized bed reactor is charged with 250 g of the plateletlike β-copper phthalocyanine used in Example 1, which is then coated as described in Example 1, except that $TiO_2$ alone is used. In total, 40 ml of $TiCl_4$ are introduced into the fluidized bed over a period of 1.5 hours. The pigment thus prepared has a green color and a Ti content of 6.6% by weight.

Under the microscope it can be seen that the β-copper phthalocyanine substrate has been coated with $TiO_2$ in the form of a smooth film which covers the substrate homogeneously all over. No non-film deposits of $TiO_2$ particles or insular outgrowths can be seen. The pigment has a strong green self-color combined with a high luster. The particle size has not been changed by the CVD process.

X-ray analysis indicates β-copper phthalocyanine and anatase.

EXAMPLE 3

The fluidized bed reactor is charged with 250 g of the plateletlike β-copper phthalocyanine used in Example 1, which is then coated as described in Example 1, except that $Fe_2O_3$ alone is used. In total 50 ml of $Fe(CO)_5$ are introduced into the fluidized bed over a period of 3 hours. The pigment thus prepared has a green color and an Fe content of 8.4% by weight.

Under the microscope it can be seen that the β-copper phthalocyanine substrate has been coated with $Fe_2O_3$ in the form of a smooth film which covers the substrate homogeneously all over. No non-film deposits of $Fe_2O_3$ particles or insular outgrowths can be seen. The pigment has a strong green self-color combined with a high luster. The particle size has not been changed by the CVD process.

X-ray analysis indicates β-copper phthalocyanine and hematite.

EXAMPLE 4

Commercial fluororubine pigment (C.I. Pigment Yellow 187) is sieved through a 325 mesh sieve to leave a coarsely divided pigment having the average dimensions (length, width, thickness) of 60, 5 and 1 μm respectively and a BET surface area of 2 $m^2/g$. This pigment is coated with $TiO_2$ in a fluidized bed in the course of 1.5 hours as described in Example 1.

The result obtained is a yellow pigment which on incorporation into a lacquer in a conventional manner shows a distinctly noticeable particle structure. The pigment contains 4% by weight of Ti and has essentially retained its yellow color.

EXAMPLE 5

Plateletlike red perylene (perylimide-2-methyl -5-chloroaniline) treated in the conditioning stage at 180° C. in a solvent mixture of 20% by volume of N-methylpyrrolidone and 80% by volume of $H_2O$ under the autogenous pressure of the solvent for 12 hours is after cooling and drying of the pigment crystals coated with $Fe_2O_3$ in the course of 1 hour as described in Example 1. The platelets have average dimensions (length, width, thickness) of 50, 10 and 0.5 μm respectively and a BET surface area of 2.5 $m^2/g$.

The pigment thus prepared has a red color, contains 3% by weight of Fe and incorporated into plastic in a conventional manner shows clearly visible individual particles.

We claim:

1. A luster pigment compound of a metal oxide film on a colored platelet-like support particle, wherein the support particle is a platelet-like organic color pigment particle having the dimensions of from 3 to 150 μm in length, from 3 to 150 μm in width and from 0.1 to 2 μm in thickness.

2. A luster pigment as claimed in claim 1, wherein the organic color pigment is β-copper phthalocyanine.

3. A luster pigment as claimed in claim 1, having a film of alternating layers of different metal oxides.

4. A process for the production of a luster pigment according to claim 1, where vaporous chlorides of titanium, vanadium or zirconium are introduced into a fluidized bed of an organic platelet-like color pigment particle and reacted with water vapor to form the corresponding oxides of said metals which are deposited as a film on the organic platelet-like pigment particle.

5. A process according to claim 4, where the amount of the vapors of the chlorides of titanium, vanadium or zirconium does not exceed 5% by volume based on the total amount of other gases or vapors introduced into the fluidized bed.

6. A process for the production of a luster pigment according to claim 1, wherein vapors of the carbonyl compounds $FE(CO)_5$ and $Cr(CO)_6$ are introduced into a fluidized bed of an organic platelet-like color pigment particle and reacted with oxygen to form the corresponding oxides of said metals which are deposited as a film on the organic platelet-like pigment particle.

7. A process according to claim 6, wherein the amount of the vapors of $FE(CO)_5$ and $Cr(CO)_6$ do not exceed 5% by volume based on the total amount of other gases or vapors introduced into the fluidized bed.

* * * * *